United States Patent
Choe

[19]

[11] Patent Number: 6,002,665
[45] Date of Patent: Dec. 14, 1999

[54] TECHNIQUE FOR REALIZING FAULT-TOLERANT ISDN PBX

[75] Inventor: Jae-Weon Choe, Seongnam, Rep. of Korea

[73] Assignee: SamSung Electronics Co., Ltd., Kyungki-do, Rep. of Korea

[21] Appl. No.: 08/925,694

[22] Filed: Sep. 9, 1997

[30] Foreign Application Priority Data

Sep. 9, 1996 [KR] Rep. of Korea .................. 1996-39008

[51] Int. Cl.[6] .............................. G01R 31/08; H04M 3/08
[52] U.S. Cl. ........................ 370/217; 370/244; 370/250; 379/279
[58] Field of Search ................................... 370/216–220, 370/236, 522; 379/210, 219

[56] References Cited

U.S. PATENT DOCUMENTS

| | | |
|---|---|---|
| 4,633,039 | 12/1986 | Holden . |
| 4,831,617 | 5/1989 | Iwasaki . |
| 4,860,333 | 8/1989 | Bitzinger et al. . |
| 4,912,698 | 3/1990 | Bitzinger et al. . |
| 5,271,058 | 12/1993 | Andrews et al. ........................ 379/210 |
| 5,469,503 | 11/1995 | Butensky et al. . |
| 5,479,396 | 12/1995 | Kusano . |
| 5,493,573 | 2/1996 | Kobayashi et al. ..................... 370/236 |
| 5,509,065 | 4/1996 | Fitzgerald . |
| 5,515,429 | 5/1996 | Kawada et al. . |
| 5,546,452 | 8/1996 | Andrews et al. . |
| 5,596,569 | 1/1997 | Madonna et al. . |
| 5,619,252 | 4/1997 | Nakano . |
| 5,848,143 | 12/1998 | Andrews et al. ....................... 379/219 |

OTHER PUBLICATIONS

PCT International Publication WO96/27254, Andrews et al., Sep. 6, 1996.

*Primary Examiner*—Hassan Kizou
*Assistant Examiner*—John Pezzlo
*Attorney, Agent, or Firm*—Robert E. Bushnell, Esq.

[57] ABSTRACT

A technique for realizing a fault tolerance of an integrated services digital network private branch exchange (ISDN PBX), includes: dualizing main control devices of the ISDN PBX into an operating section and a waiting section so as to sustain a subscriber service in progress even when the ISDN PBX has an unexpected problem; allowing the operating section to transfer to the waiting section various information required for performing a section switching to sustain an identical status between the operating section and waiting section, while providing a service requested by a user; and allowing the waiting section to perform the section switching so as to sustain the service as a new operating section when the operating section has an error.

4 Claims, 5 Drawing Sheets

TECHNIQUE FOR REALIZING FAULT-TOLERANT ISDN PBX

CLAIM OF PRIORITY

This application makes reference to, incorporates the same herein, and claims all benefits accruing under 35 U.S.C. §119 from an application for *METHOD FOR REALIZING FAULT-TOLERANT ISDN PBX* earlier filed in the Korean Industrial Property Office on the 9th of September 1996 and there duly assigned Ser. No. 39008/1996.

BACKGROUND OF THE INVENTION

1. Field of the Invention

The present invention relates to an ISDN (Integrated Services Digital Network) private branch exchange (PBX), and more particularly to a technique for realizing a fault tolerance capable of sustaining a subscriber service in progress even when an ISDN PBX has unexpected troubles.

2. Description of the Related Art

An ISDN PBX has a data communication function as well as the existing voice communication function. Recently with the development of text and image communication, the ISDN PBX also includes a multimedia function which can process voice, data, text, and images. Further, with the diversification of the services in such an ISDN PBX, it becomes very important to secure a reliability of the exchange system.

The reliability of the exchange system refers to a capability of performing a function without trouble. In order to improve the system reliability, there have been proposed a few approaches: one is a fault prevention, and another is a fault tolerance. The existing fault prevention is to realize the system prepared for the worst by using high reliability elements, to prevent all expected errors in advance. However, the fault tolerance realizes the system by using standard elements. Thus, although there may be a possibility of errors, the fault tolerance dualizes the system by using additional elements, to cope with the errors.

Since the fault tolerance method has an increased cost due to the duality of the system, many conventional systems adopt the fault prevention method to increase the reliability of the system. However, it is almost impossible to realize a perfect system that takes all of the expected errors into account in advance. Further, since the fault tolerance method, which deals with an error that has already been generated in the system, and does not require a perfect system, the system may be realized with inexpensive standard elements. However, the fault prevention method uses the high reliability expensive elements in order to prevent for sure the error generation, so that the cost may increase undesirably. Namely, fault prevention has a limitation of preventing the errors and has a high cost. Thus, fault tolerance has recently been used for improving the reliability of the system.

The fault-tolerant system refers to a system that can sustain the normal operation without external assistance, even when the system has an error during operation. In order to realize such a fault-tolerant system, the main elements of the system are dualized. Thus, if an element has an error, a corresponding element will take the place of the fault element to sustain the normal operation. Further, if applied to a large-sized exchange system, the fault tolerance system has a very high cost. Accordingly, it is preferable to apply the fault tolerance for a private branch exchange (PBX). Moreover, although the system can be dualized into several modules, it is preferable to dualize the system into two modules, i.e., an operating section and a waiting section, taking the cost into consideration.

The following patents each disclose features in common with the present invention but do not teach or suggest the specifically recited technique for realizing a fault tolerant ISDN PBX as in the present invention: U.S. Pat. No. 4,831,617 to Iwasaki, entitled *Data Communication System Having Means For Switching Between Main And Stand-By Apparatuses*, U.S. Pat. No. 5,596,569 to Madonna et al., entitled *Telecommunications Switch With Inproved Redundancy*, U.S. Pat. No. 4,912,698 to Bitzinger et al., entitled *Multi-Processor Cential Control Unit Of A Telephone Exchange System And Its Operation*, U.S. Pat. No. 4,860,333 to Bitzinger et al., entitled *Error Protected Central Control Unit Of A Switching System And Method Of Operation Of Its Memory Configuration*, U.S. Pat. No. 4,633,039 to Holden, entitled *Master-Slave Microprocessor Control Circuit*, U.S. Pat. No. 5,469,503 to Butensky et al., entitled *Method For Resynchronizing Secondary Database And Primary Database With Preservation Of Functionality Of An Automatic Call Distribution System*, U.S. Pat. No. 5,619,252 to Nakano, entitled *Video Telephone System And Method For Transmitting And Receiving Signals When There Is A Failure In The System*, U.S. Pat. No. 5,546,452 to Andrews et al., entitled *Communications System Using A Central Controller To Control At Least One Network And Agent System*, U.S. Pat. No. 5,515,429 to Kawada et al., entitled *Backup Apparatus Against Line Defect And Backup Method Against Line Defect*, U.S. Pat. No. 5,479,396 to Kusano, entitled *Redundant System Having Signal Path Operation Function*, and U.S. Pat. No. 5,509,065 to Fitzgerald, entitled *Dual Span Monitoring System For Maintenace Shelf Control*.

SUMMARY OF THE INVENTION

It is therefore an object of the present invention to provide a technique for realizing a fault tolerance capable of sustaining a subscriber service in progress, by actively dealing with unexpected errors generated in an exchange system.

It is another object of the present invention to provide a technique for realizing an exchange system dualized into an operating section and a waiting section.

According to an aspect of the present invention, a method of realizing a fault-tolerant ISDN PBX includes the steps of dualizing main control devices of the ISDN PBX into an operating section and a waiting section so as to sustain a subscriber service in progress even when the ISDN PBX has an unexpected trouble; allowing the operating section to transfer to the waiting section various kinds of information required for performing a section switching to sustain an identical status between the operating section and waiting section, while providing a service requested by a user; and allowing the waiting section to perform the section switching so as to sustain the service as a new operating section when the operating section has an error.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
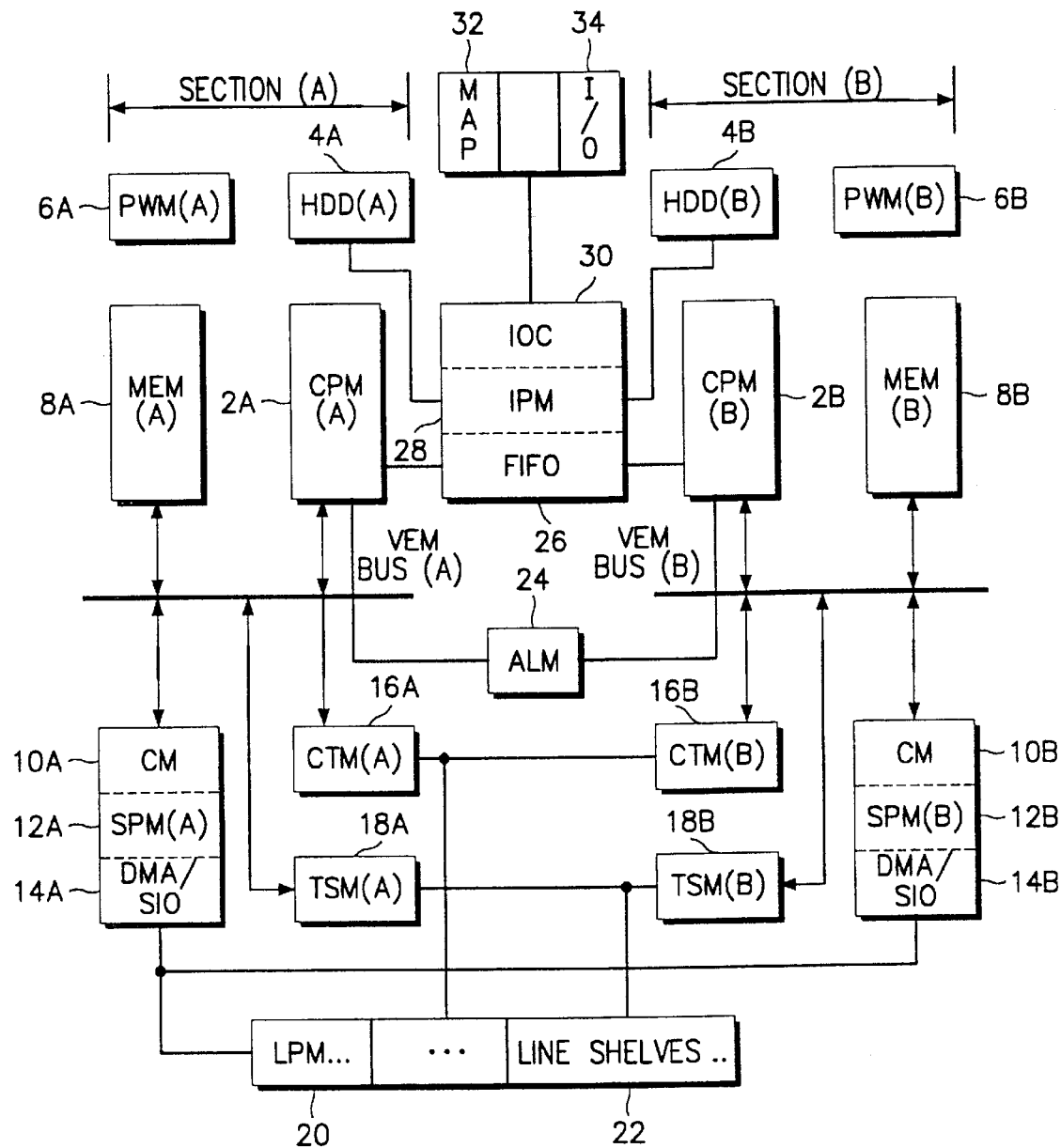
FIG. 1 is a block diagram of the hardware of a dual ISDN PBX according to an embodiment of the present invention.

A preferred embodiment of the present invention will be described in detail hereinbelow with reference to the attached drawings, in which the like reference numerals represent the like elements.

Referring to FIG. 1, a fault-tolerant ISDN PBX according to the present invention is dualized into a section A and a section B. Therefore, when an unexpected error is generated by a particular element in one of the sections A and B, a corresponding element in another section takes the place of the fault element, so that the system may operate normally. Namely, when section A becomes an operating section, section B becomes a waiting section, and vice versa.

As illustrated in FIG. 1, the sections A and B respectively include central process modules (CPM) 2A and 2B, hard disk drives (HDD) 4A and 4B, power modules (PWM) 6A and 6B, memory modules (MEM) 8A and 8B, common memories (CM) 10A and 10B, signal processing modules (SPM) 12A and 12B, direct memory access/serial input output modules (DMA/SIO) 14A and 14B, clock tone modules (CTM) 16A and 16B, time switch modules (TSM) 18A and 18B, and VEM buses VEM(A) and VEM(B).

Further, the sections A and B share a subscriber processing module (LPM) 20, a plurality of line shelves 22, an alarm module (ALM) 24, a first-in first-out (FIFO) module 26, an input/output processing module (IPM) 28, an input/output controller (IOC) 30, a maintenance and administration processing module (MAP) 32, and an input/output device (I/O) 34.

Figure 2:
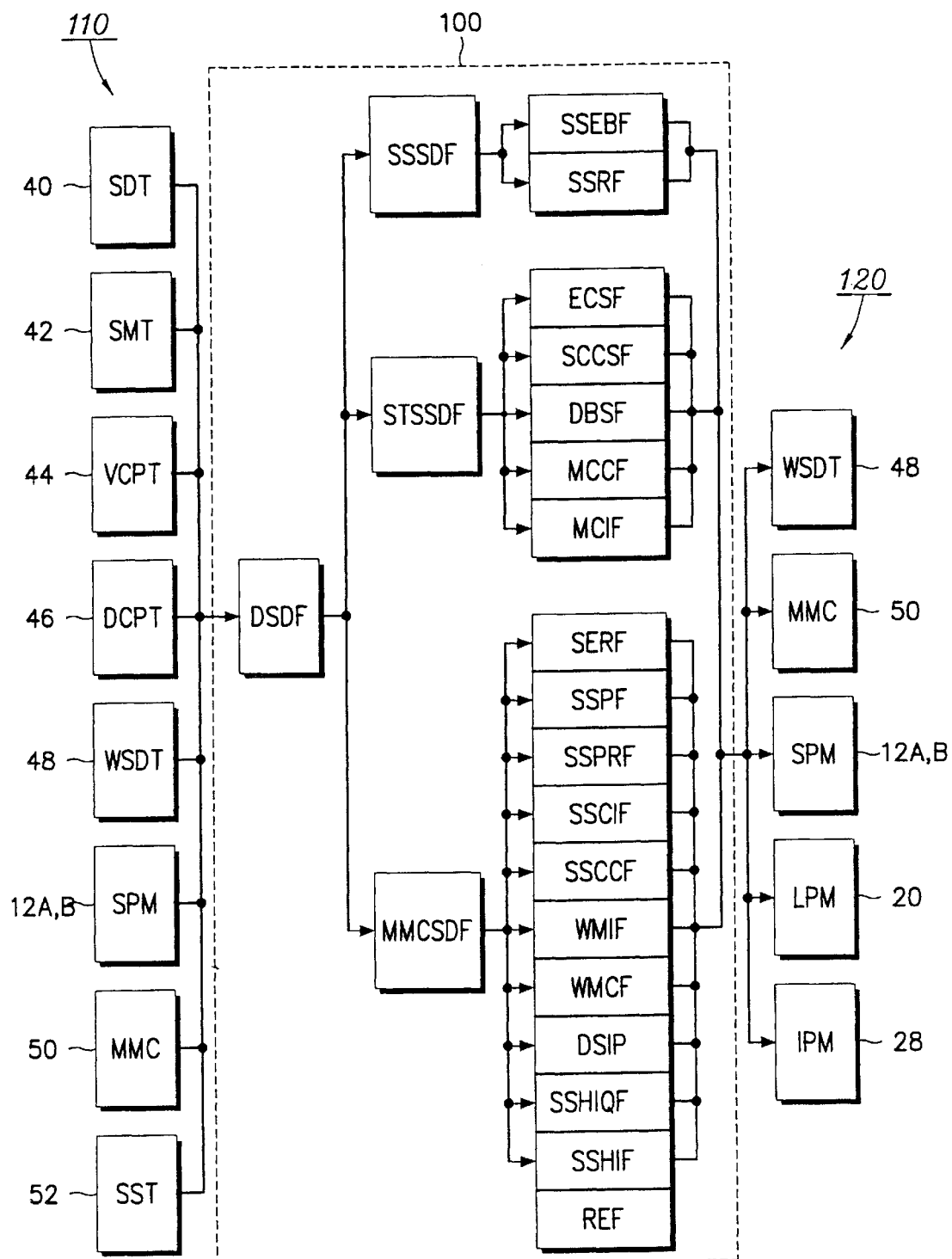
FIG. 2 is a block diagram of the software of the dual ISDN PBX of FIG. 1.

Referring to FIG. 2, the software (hereinafter, referred to as "dualizing task") in the central process modules 2A and 2B for controlling the dual ISDN PBX of FIG. 1 is composed of a system diagnosis task (SDT) 40, a system monitoring task (SMT) 42, a voice call processing task (VCPT) 44, a data call processing task (DCPT) 46, a waiting section dualizing task (WSDT) 48, a system structuring task (SST) 52, and so forth.

As illustrated in FIG. 2, a dualizing task 100 includes a dual service distribution function (DSDF) which is composed of a section switching service distribution function (SSSDF), a status sustaining service distribution function (STSSDF), and a man machine communication service distribution function (MMCSDF). The section switching service distribution function (SSSDF) includes a section switching environment building function (SSEBF) and a section switching and recovering function (SSRF). The status sustaining service distribution function (STSSDF) includes an established call sustaining function (ECSF), a short-circuited call sustaining function (SCCSF), a database sustaining function (DBSF), a memory contents changing function (MCCF), and a memory contents inquiry function (MCIF). The man machine communication service distribution function (MMCSDF) includes a switchover execution request function (SERF), a section switching prohibiting function (SSPF), a section switching prohibition release function (SSPRF), a section switching condition inquiry function (SSCIF), a section switching condition changing function (SSCCF), a waiting memory inquiry function (WMIF), a waiting memory changing function (WMCF), a dual status inquiry function (DSIF), a section switching history inquiry function (SSHIQF), a section switching history initialization function (SSHIF), and a routing execution function (REF).

In FIG. 2, blocks 110 represent input sources for requesting the above mentioned dual service distribution functions, and blocks 120 represent target sources for outputting the requested functions. As illustrated, the input sources are the system diagnosis task (SDT) 40, the system monitoring task (SMT) 42, the voice call processing task (VCPT) 44, the data call processing task (DCPT) 46, the waiting section dualizing task (WSDT) 48, the signal processing modules 12A and 12B, a man machine communication (MCC) 50, and the system structuring task (SST) 52. Further, the target sources are the waiting section dualizing task (WSDT) 48, the man machine communication (MCC) 50, the signal processing modules 12A and 12B, the subscriber processing module (LPM) 20, and the input/output processing module (IPM) 28.

Figure 3:
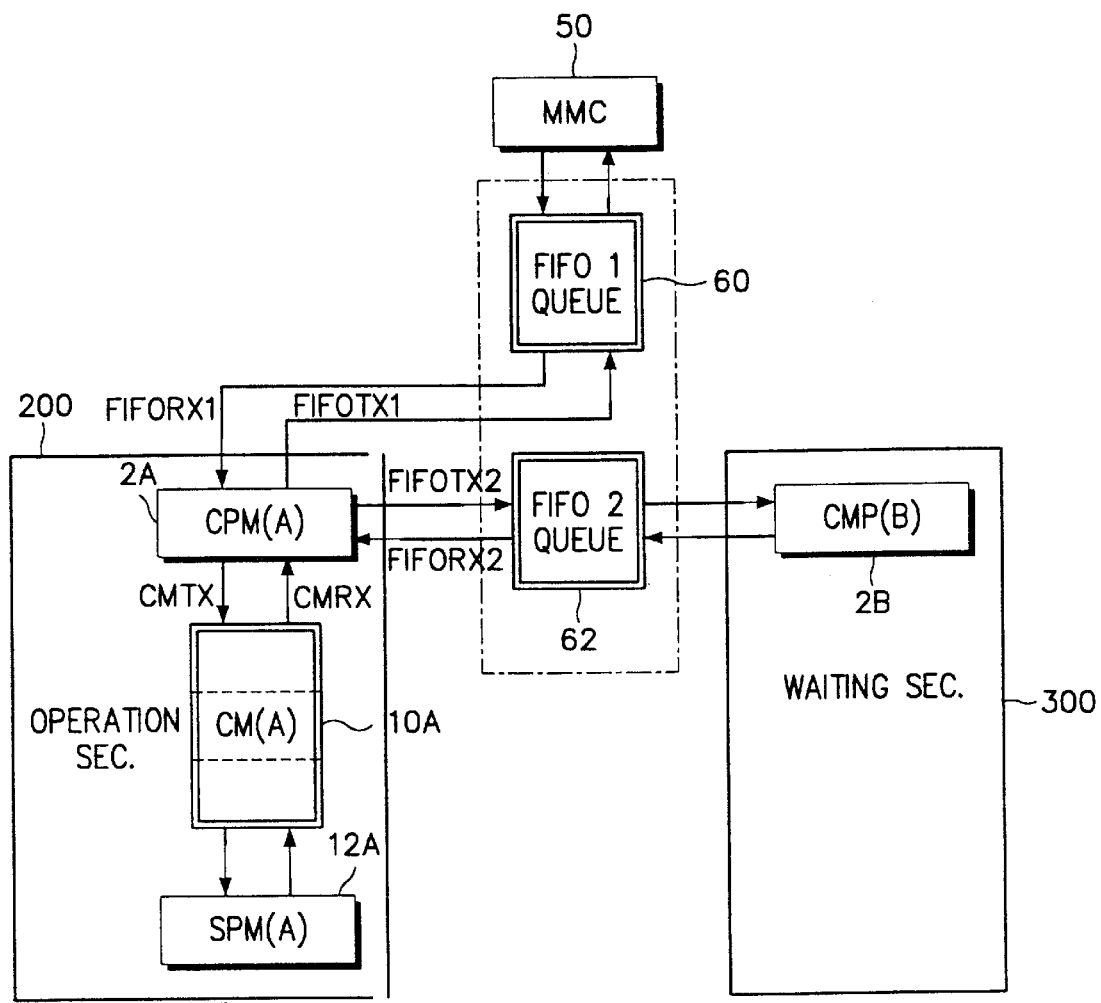
FIG. 3 is a diagram explaining an interface of a dual ISDN PBX.

Referring to FIG. 3, there is illustrated an interface of the dual ISDN PBX according to the present invention, in which it is assumed that the section A of FIG. 1 is an operating section 200, and the section B is a waiting section 300, for the convenience of explanation.

As illustrated in FIG. 3, in order to sustain an identical status between the mutual sections 200 and 300, the operating section 200 make FIFOTX2 and FIFORX2 system calls to exchange various control information with the waiting section 300 via a FIFO2 queue 62 in the FIFO module 26 of FIG. 1. Further, in case of a system abnonmality, the central processing module 2A of the operating section 200 performs a common memory communication via the common memory 10A by using a CMTX system call, so as to send to the signal processing module 12A a response request message for rechecking an engaged subscriber port or a section switching message for switching the waiting section 300 to a new operating section. Sometimes, the common memory communication with use of the CMTX system call is used for routing the message to a dualizing task of another node. Further, the central processing module 2A of the operating section 200 comnmunicates via a FIFO1 queue 60 in the FIFO module 26 by using FIFOTX1 and FIFORX1 system calls, in order to process dualizing functions (e.g., dual test and program version-up functions) requested by the man machine communication 50 and to generate the processing results. Further, in order for the dualizing task to switch and recover a section so as to normally support the service in case of the system abnormality, it is necessary for the dualizing task to exchange information with various tasks and modules in the system.

Figure 4:
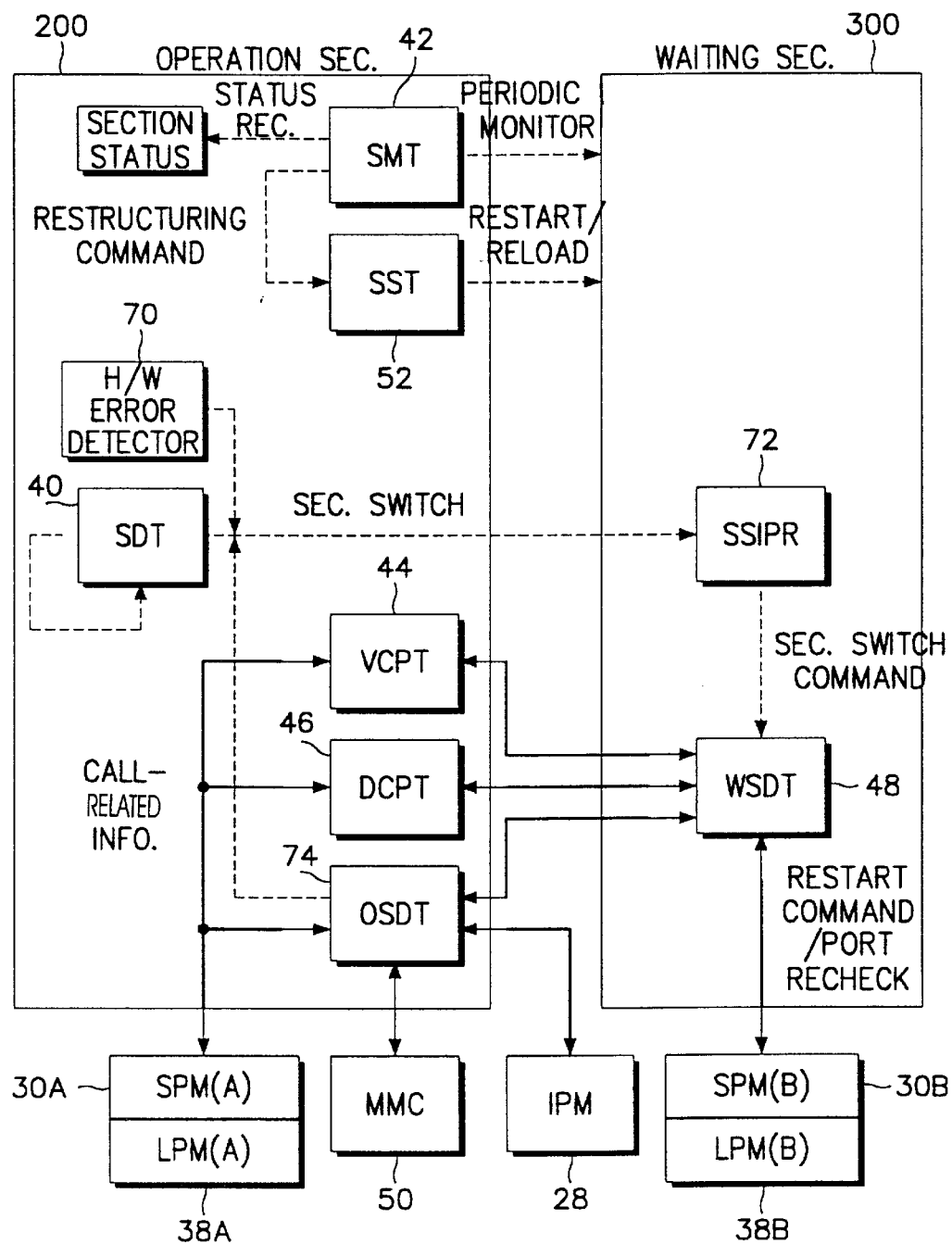
FIG. 4 is a diagram showing the mutual relationship between tasks and modules related to duality.

Referring to FIG. 4, a description follows as to the mutual relationship between tasks and modules related to the duality according to the present invention. The system diagnosis task 40 diagnoses all expected hardware and software errors of the system, and if an error is detected, generates a non-maskable interrupt (NMI; sometimes called a section switching interrupt). The system monitoring task 42 periodically monitors a status of the waiting section 300 and records the monitored status, to provide the waiting section 300 with a restart or reset command in case of an abnormality. Further, if necessary, the system monitoring task 42 requests the system structuring task 52 to reload, so as to sustain a normal operation of the waiting section 300. Moreover, the system monitoring task 42 periodically monitors a variation of the system load and configuration, to generate the section switching non-maskable interrupt (NMI) when a variation has exceeded a reference value. The voice call processing task 44 and the data call processing task 46 occasionally provides the waiting section 300 with voice or data call establishment/short-circuit information and database changing information, which are generated by the operating section 200, to sustain the identical status between the mutual sections. Therefore, even after the section switching, the control information related to the voice and data calls may be sustained.

The waiting section dualizing task 48 receives control information from the operating section 200 during sustain the identical status with the operating section 200 in normal operation, and performs a section switching and recovery operation in case of a system abnormality. Besides, the waiting section dualizing task 48 performs an additional dualizing function such as the waiting section memory inquiry function, which is requested by the man machine communication 50.

The signal processing modules 30A and 30B communicate with each other to generate a section switching message for allowing the waiting section 300 to operate as a new operating section, and a response request message for rechecking the engaged subscriber port. Further, the signal processing modules 30A and 30B communicate with each other to send and receive the dual service request messages related to other nodes, requested by the man machine communication 50, and the processing resultant message. The man machine communication 50 communicates to support the dual services via a man-machine interface. The system structuring task 52 communicates to download various kinds of system programs and data, when initializing the system or when the waiting section 300 operates abnormally. The input/output processing module 28 generates a section switching execution result to a printer, or stores the section switching execution result on the hard disk drives 4A and 4B. The subscriber processing modules 38A and 38B recheck engaged ports therein, in order to solve a problem of the call control information destruction due to the section switching. Namely, the subscriber processing modules 38A and 38B generate the response request message for rechecking the engaged subscriber port.

In operation, the operating section 200 exchanges main information with the waiting section 300, during the normal operation. Specifically, the voice or data call processing task 44 or 46 provides the waiting section 300 with control information in case of a call connection or disconnection, so as to allow the waiting section 300 to sustain the call related information and to perform a call connection and disconnection operation. Further, when changing the system database, changing information is transferred to sustain the databases identically between the sections. Besides, the system monitoring task 42 of the operating section 200 periodically monitors a status of the waiting section 300 and records the monitored information, so as to allow the system structuring task 52 to perform a reloading or restart operation to sustain a normal operation of the waiting section 300 when the waiting section 300 operation is abnormal.

If a fatal hardware or software error is generated while the operating section 200 is operating, the system diagnosis task 40 or a hardware error detector 70 will detect the error and generate a section switching interrupt. Otherwise, it is possible to generate the non-maskable section switching interrupt to the waiting section 300 by using the man machine communication 50. If the section switching interrupt is generated, a section switching processing routine 72 sends a section switching command to the waiting section dualizing task 48, to transfer the control to the waiting section dualizing task 48. Then, the waiting section dualizing task 48 performs a section switching operation that allows the waiting section 300 to serve as a new operating section, to continue the service in progress. After the section switching is successfully completed, the new operating section sends the reloading or restart command to the operating section having a problem and restores the operating section having a problem so as to allow it to operate as a waiting section.

The ISDN PBX according to an embodiment of the present invention continuously checks the system by means of the system diagnosis function or the system monitoring function, to perform the section switching and recovery operation by driving the dualizing task if a predetermined hardware or software error is generated. Further, the man machine communication compulsorily performs the section switching function or various dualizing functions via the man machine communication function.

In order to realize such a duality of the system, the present invention contemplates a method of determining an execution area of the dualizing task; a method of assigning a top priority order to the dualizing task in case of a system abnormality; a method of minimizing a call control information loss due to the section switching; a method of solving a problem due to an unavoidable call control information loss; and a method of solving a voice or data loss problem due to the section switching. Detailed descriptions follow for these methods for dualizing the ISDN exchange according to the present invention. Thereafter, the section switching and recovery function according to the present invention are described with reference to FIG. 5.

Method of Determining Execution Area of Dualizing Task

A task (or a process) operating in the system is divided into a system task operating in a system (or kernel) area and a user task operating in a user area according to the execution area at which the task is executed. In order to realize the dual function, it should be first determined whether the dual function will be realized by an interrupt service routine or the system task in the system area, or will be realized by the user task.

In case of a system abnormality, the section switching and recovery operation should be immediately performed. Thus, when realizing the dual function at the interrupt service routine in the system area, the dual function should be realized in the non-maskable interrupt service routine. Besides, in order to execute the dual function, it is unavoidable to make a system call of an operating system using a software trap. However, since a software trap with the lower priority order is blocked in the light of the characteristic of the non-maskable interrupt, it is impossible to make a system call of the operating system. Namely, realizing the dual function in the interrupt service routine is improper, since it causes a priority order problem. Further, when realizing the dual function by the system task in the system area, the dualizing task is registered on a system event list upon generation of the section switching interrupt in the light of a configuration of the operating system, and is driven by a dispatch routine upon a generation of a 10 msec timer interrupt or after the system call of the operating system.

Realizing the dual function by the system task in the system area has a time delay up to the dispatch routine for driving the dualizing task, so that it may not meet the demand for an emergent execution. Therefore, the dualizing task function should be realized by the user task in the user area.

Method of Assigning Top Priority Order to Dualizing Task in Case of System Abnormality Generally, the dualizing task of the waiting section has a relatively lower priority order compared to other tasks. Thus, an emergent dualizing task may not be performed in time due to the lower priority order, thereby resulting into a starvation problem. Therefore, it is necessary to assign the top priority order to the dualizing task in case of the system abnormality. Further, since the dualizing task should perform an emergent operation for remedying the fatal error generated in the system, the dualizing task should keep the top priority order while performing the section switching and recovery operation. If the dualizing task does not keep the top priority order during the section switching and recovery operation, various kinds of unexpected problems may be caused due to the priority order problem of the task.

Since the section switching interrupt is the non-maskable, it is impossible to make a system call of the operating system in the service routine. Thus, the priority order of the dualizing task can not be changed directly. Therefore, an emergent message should be transferred to the dualizing tasks 74 and 48 to allow them to have the top priority order. That is, the emergent message function allows the corresponding task to have the top priority order when sending the message, so that the message can be quickly received. However, upon receiving the message, the priority order of the dualizing task is changed back to the original priority order, so that the dualizing task may transfer the control to other tasks. Therefore, the dualizing task should change the priority order of itself to sustain the top priority order by immediately using the system call upon receiving the emergent message. When the section switching and recovery operation is successfully completed and the waiting section can operate as a new operating section, the dualizing task should change the priority order of itself back to the original priority order.

Method of Minimizing Call Control Information Loss Due to Section Switching

The voice or data call processing task 44 or 46 of the operating section 200 sends control information to the waiting section 300 in case of a call connection or disconnection, so as to allow the waiting section 300 to sustain the call control information and to perform the call connection and disconnection operation. However, since the control information for sustaining the identical status between the sections may be lost due to the section switching, there is needed a method for minimizing the call control information loss. For that purpose, the waiting section dualizing task 48 retransfers to the message queue of its own a section switching request message that the section switching interrupt service routine 72 has transferred via the emergency message queue. In this manner, it is possible to recover the call control information that the operating section 200 has stored in the FIFO2 queue 62.

Specifically referring to FIGS. 3 and 4, the worst condition is assumed in that a system error is generated causing the section switching non-maskable interrupt, when the operating section 200 stores the call control information in the FIFO2 queue 62 and generates the FIFOTX2 interrupt to the waiting section 300. The FIFORX2 interrupt processing routine is temporarily stopped by the section switching non-maskable interrupt, and the section switching interrupt processing routine 72 transfers the section switching request message to the emergent message queue of the dualizing task 48 in order to have the dualizing task 48 become the top priority dualizing task. Thereafter, the stopped FIFORX2 interrupt processing routine is restarted to store the call control information read from the FIFO2 queue 62 into the FIFORX2 buffer and register the FIFORX2 event on the system event list. Then, the dispatch routine of the operating system processes the FIFORX2 event that transfers the call control information from the FIFORX2 buffer to the normal message queue of the dualizing task, and thereafter the dualizing task 48 having the top priority order is driven based on a task schedule. Although the dualizing task 48 loses the section switching message from the emergent message queue, if the section switching operation is immediately performed, the call control information in the previously transferred normal message queue will be lost. Thus, the section switching operation should be temporarily reserved. Namely, the section switching request message is retransferred to the normal message queue to process the previously transferred call control information. Thereafter, the section switching and recovery operation is performed.

Method of Solving Problem Due to Unavoidable Call Control Information Loss

Although the proposed method (c) can minimize the call control information loss due to the section switching, there may be still an unavoidable loss. In order to sustain the identical status between the sections, the operating section 200 transfers the call connection/short-circuit control information to the waiting section 300 via the FIFO2 queue 62. However, if the section switching is performed during the course of transferring the control information, the call control information stored in the FIFOTX2 message buffer will be lost, thereby causing unexpected problems. (Here, the call control information generated in the course of reading from the waiting section 300 the call control information stored in the FIFO2 queue 62 is temporarily stored in the FIFOTX2 message buffer.) Thus, there is a demand for solving the unexpected problems.

If the call establishment control information is lost in the course of performing the section switching, the exchange recognizes that there are a new call request by the user after the section switching, and generates the dial tone. However, since the section switching of the exchange is achieved during a very short time interval that the user cannot be aware of, the user may hear the dial tone during a very short time interval while receiving the call tone from the counterpart subscriber. This is not a serious problems. However, in case of the short-circuited call control information, the problem becomes serious. If the section switching is performed when the user completes the call, the short-circuited call control information will be lost. Then, the waiting section 300 continuously remains in a busy state, thereby causing an increased charging problem. Therefore, in order to solve the short-circuited call control information loss problem, the response request message should be transferred to every subscriber port in the busy state, to directly recheck whether or not there are any calls short-circuited during the section switching.

Method of Solving Voice or Data Loss Problem Due to Section Switching

Not only the control information but also the data or voice may be lost due to the section switching. Thus, although the voice or data being transferred in real time is lost, the exchange should be controlled such that the user cannot be aware of the voice or data loss at all. The voice loss due to the section switching is closely related with the section switching time, and the data loss is closely related with the data communication protocol. Although the data is transmitted and received by the packet and the packet is lost during the call due to the line problem or the section switching of the exchange, the data is retransferred by an end-to-end communication protocol of the transmission/reception terminal, which does not cause a serious problem. However, if the voice is lost over 50 msec, it will be heard as a noise. In the worst case, if a syllable or a word is lost, it may be difficult to hear the voice. Therefore, the section switching time should be less than 50 msec.

Finally, the section switching and recovery function according to the present invention will be described. The section switching and recovery function which is a core of the duality is performed when the software or hardware error is generated or when the man machine communication requests the section switching, so that the waiting section may continuously provide, as a new operating section, the user with the service.

Figure 5:
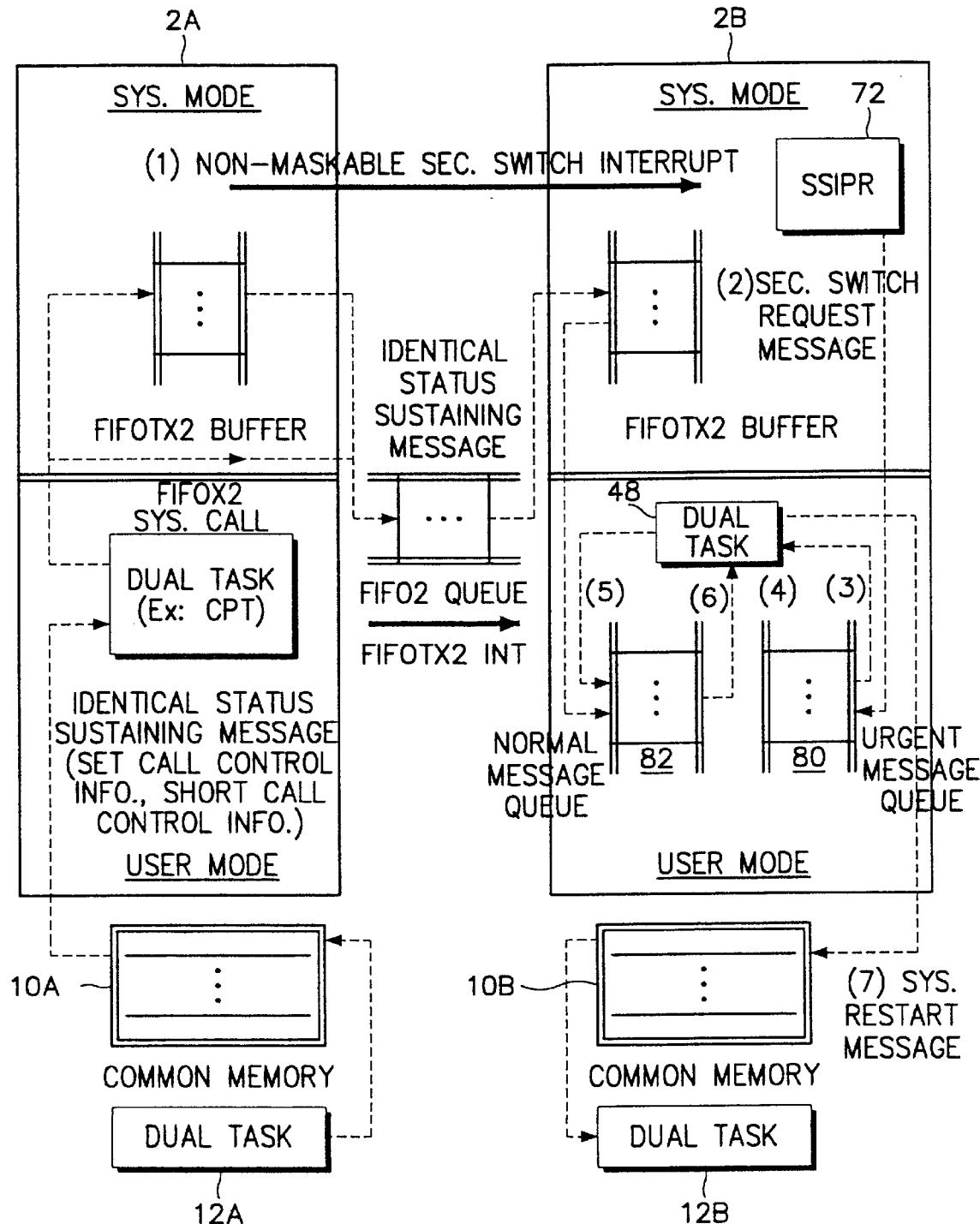
FIG. 5 is a flowchart of the technique for controlling a section switching and recovery according to an embodiment of the present invention.

The section switching and recovery operation is performed as shown in steps (1) through (10) of FIG. 5. FIG. 5 is a flowchart of the technique for controlling the section switching and recovery according to an embodiment of the present invention, in which it is assumed that the section A of FIG. 1 is the operating section 200, and the section B is the waiting section 300, for the convenience of explanation.

If in step (1) the section switching is requested by the system error of the operating section 200 or the man machine communication 50, the central processing module 2A of the operating section 200 will generate the non-maskable section switching interrupt to the waiting section 300.

In step (2) the section switching interrupt 72 generates the section switching request message to an emergent message queue 80 of the dualizing task, in order to have the dualizing task 48 become a task having the top priority order.

During step (3) upon receiving the section switching request message from the emergent message queue 80, the dualizing task 48 changes its priority order into the top priority order, records a section switching start time, and transfers the section switching message notifying that the current section is changed into the operating section to the signal processing module 12B to build a minimum environment in which the dualizing task 48 operates.

In step (4) various kinds of control messages for sustaining the identical status are transferred to the normal message queue 82 of the dualizing task 48 by the dispatch routine of the operating system.

In step (5) in order to perform the section switching operation after the transferred various kinds of messages related to the duality are first processed, the section switching request message is retransferred to the normal message queue 82 of the dualizing task 48.

After reading messages from the normal message queue 82 and processing the various kinds of control messages, during step (6) the dualizing task 48 reads the section switching request message to start the section switching operation.

During step (7) a system re-driving start message is transferred to the subscriber processing modules 38A and 38B for the section switching, and the response request message is transferred to all subscriber ports, which are currently in the busy state, in the subscriber processing modules, to check whether or not there are any calls short-circuited in the course of performing the section switching. Thereafter, a system re-driving completion message is transferred to the subscriber processing modules 38A and 38B. The above process is repeatedly performed for all the subscriber processing modules.

During step (8) a section switching result message is transferred to a monitor, the input/output processing module 28, and the hard disk drives 4A and 4B of the man machine communication 50 to generate the section switching result.

During step (9) a service requested by a subscriber which is recovered into a new operating section after completion of the successful section switching is continuously provided. After the normal section switching, the new operating section transfers the reloading or restart command to the operating section having a problem, to restore the operating section having a problem and allow it to operate as the waiting section. Although the reloading or restart command is transferred at the beginning of the section switching in order to quickly restore the abnormal section, if the section switching is requested to the section having a problem in the course of performing the section switching or due to the other problems, both sections will be stopped. Accordingly, the section having a problem should be restored at the final step of the section switching.

A section switching completion start is recorded during step (10) and the priority order of the dualizing task is restored to the original priority order of the dualizing task.

As described in the foregoing, the ISDN PBX providing a voice and data communication service according to the present invention can sustain the subscriber service in progress in case of an abnormality, thereby realizing the fault tolerance. Main control parts of the exchange are dualized into the operating section and the waiting section. Thus, when unexpected hardware or software errors are generated in the ISDN PBX, there is no possibility that both sections are stopped at the same time. The operating section occasionally transfers various kinds of information to the waiting section while providing the services according to the user's request, so as to sustain the identical status between the mutual sections and to allow the waiting section to be switched to a new operating section for sustaining the service, in case the operating section has an error.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A method of realizing a fault tolerance of an integrated services digital network private branch exchange, comprising the steps of:

dualizing main control devices of said integrated services digital network private branch exchange into an operating section and a waiting section so as to sustain a subscriber service in progress even when said integrated services digital network private branch exchange has an unexpected problem;

allowing said operating section to transfer to said waiting section information required for performing a section switching to sustain an identical status between said operating section and waiting section, while providing a service requested by a user; and allowing said waiting section to perform the section switching so as to sustain the service as a new operating section when said operating section has an error;

said control devices dualized into said operating section and waiting section comprising: a central processing module, a hard disk drive, a power module, a memory module, a common memory, a signal processing module, a direct memory access/serial input output module, a clock tone module, a time switch module, and a communication bus.

2. A method of realizing a section switching and recovery operation in an integrated services digital network private branch exchange having main control devices which are dualized into an operating section and a waiting section, the method comprising:

a first step of allowing said operating section to exchange various control information with said waiting section in a normal condition, so as to sustain an identical status between said operating section and waiting section;

a second step of detecting an error by using at least one of a system diagnosis task or a hardware error detector and generating a section switching interrupt fed to said waiting section if said operating section has a fatal hardware or software error during operation;

a third step of allowing a section switching processing routine of said waiting section to transfer a section switching command to a waiting section dualizing task upon generation of the section switching interrupt, and transfer a control to said dualizing task;

a fourth step of, in response to said third step, allowing said waiting section dualizing task to perform a section switching operation for transforming said waiting section into a new operating section so as to continuously perform a service in progress; and a fifth step of, after the section switching, allowing said new operating section to transfer a reloading or restart command to said operating section having an error so as to operate as the waiting section after recovering from the error;

said first step comprising the steps of:

allowing a voice or data call processing task of the operating section to transfer control information to the waiting section in case of a call connection or disconnection, to allow said waiting section to perform a call related information sustaining operation and a call connection or disconnection operation;

transferring changing information when changing a system database, to sustain the system database identical between the operating section and waiting section; and allowing a system monitoring task of the operating section to periodically monitor a status of the waiting section and record the monitored status, so as to allow a system structuring task to perform a reloading or restart if the waiting section is in an abnormal status.

3. A fault tolerant integrated services digital network private branch exchange, comprising:

dual main control devices of said integrated services digital network private branch exchange consisting of an operating section and a waiting section so as to sustain a subscriber service in progress even when said integrated services digital network private branch exchange has an unexpected problem;

means for allowing said operating section to transfer to said waiting section information required for performing a section switching to sustain an identical status between said operating section and waiting section, while providing a service requested by a user; and means for allowing said waiting section to perform the section switching so as to sustain the service as a new operating section when said operating section has an error;

said dual control devices consisting of said operating section and waiting section comprising: a central processing module, a hard disk drive, a power module, a memory module, a common memory, a signal processing module, a direct memory access/serial input output module, a clock tone module, a time switch module, and a communication bus.

4. A section switching and recovery apparatus in an integrated services digital network private branch exchange having dual main control devices consisting of an operating section and a waiting section, the apparatus comprising:

a first means for allowing said operating section to exchange various control information with said waiting section in a normal condition, so as to sustain an identical status between said operating section and waiting section;

a second means for detecting an error by using at least one of a system diagnosis task or a hardware error detector and for generating a section switching interrupt fed to said waiting section, if said operating section has a fatal hardware or software error during operation;

a third means for allowing a section switching processing routine of said waiting section to transfer a section switching command to a waiting section dualizing task upon generation of the section switching interrupt, and transfer a control to said dualizing task;

a fourth means for allowing said waiting section dualizing task to perform a section switching operation for transforming said waiting section into a new operating section so as to continuously perform a service in progress; and a fifth means for allowing said new operating section to transfer a reloading or restart command to said operating section having an error so as to operate as the waiting section after recovering from the error;

said first means comprising:

a means for allowing a voice or data call processing task of the operating section to transfer control information to the waiting section in case of a call connection or disconnection, to allow said waiting section to perform a call related information sustaining operation and a call connection or disconnection operation;

a means for transferring changing information when changing a system database, to sustain the system database identical between the operating section and waiting section; and a means for allowing a system monitoring task of the operating section to periodically monitor a status of the waiting section and record the monitored status, so as to allow a system structuring task to perform a reloading or restart if the waiting section is in an abnormal status.

\* \* \* \* \*